March 16, 1965 W. B. HAMPTON ETAL 3,173,775
APPARATUS FOR CLEANING GASES
Filed Sept. 8, 1961 2 Sheets-Sheet 2

INVENTOR.
WILLIAM B. HAMPTON
BY WILLIAM D. HAMPTON
WILSON, SETTLE & CRAIG
ATTORNEYS 3,173,775
APPARATUS FOR CLEANING GASES
William B. Hampton, Detroit, and William D. Hampton, Southfield, Mich., assignors to Oil Vac Filters Corp., a corporation of Michigan
Filed Sept. 8, 1961, Ser. No. 136,774
3 Claims. (Cl. 55—224)

This invention relates to apparatus for cleaning gases, and more particularly to apparatus for efficiently removing fine particulate materials such as dust particles and the like from air used in supplying gaseous fuel mixtures to internal combustion engines for driving the same.

In the operaton of any internal combustion engine, it is highly important that dust particles be substantially completely removed from the combustion gases because of the abrasive nature of these particles. When dust particles are drawn into an engine through the air intake manifold, they become deposited in the film of oil carried on the upper cylinder surfaces to find their way into the lubrication system where they produce scoring and wear of such vital parts as piston rings, bearing surfaces and the like. These dust particles cause wear and eventual destruction of the engine.

In an effort to combat the abrasive effects of air-borne dust particles, elaborate precautions have been taken to filter the particles out of the intake air. Also, oil filters have been developed for removing the dust particles that work their way into the engine lubrication oil.

These prior efforts have given rise to air cleaners of various kinds that have displayed generally low relative degrees of cleaning efficiency under extremely heavy duty conditions such as in earth-moving diesels and the like and require frequent cleaning and maintenance. More recently the dry type paper filter cartridge has been introduced. However, it is well known that this type of filter is a delicate item and is subject to damage during cleaning. Also an operator often will damage the unit in replacing it as by getting the retaining cover locked or twisted or by jamming the unit back into its retaining receptacle. Thereafter, filtering efficiency of the unit is substantially reduced and often rendered nil.

Therefore, if an air cleaner could be devised that would substantially completely remove dust particles of the finest particle size from engine air, and that would be foolproof in cleaning and maintenance, a substantial step forward in the art would be provided.

Accordingly, it is an important object of the present invention to provide improved apparatus for removing fine particulate materials from gases.

A further object of the present invention is to provide apparatus for removing particulate materials from gases wherein the gas is subjected to a cyclonic action and a portion of it is diverted to carry out most of the particulate materials and the remaining portion is thereafter passed over an oil coated surface which is effective to substantially completely remove all remaining particulate materials.

Another object is to provide a novel air cleaner for an internal combustion engine that utilizes a precleaner of the centrifugal type in combination with an oil bath air filter.

A still further object is to provide a novel air cleaner for internal combustion engines that comprises a centrifugal precleaner of improved constructional configuration in combination with an oil bath air filter.

A still further object is to provide an air cleaner for internal combustion engines wherein a precleaner of improved efficiency is used in combination with an oil bath air filter.

Other objects of this invention will appear in the following description and appended claims, reference being had to the accompanying drawings forming a part of this specification wherein like reference characters designate corresponding parts in the several views.

In the drawings:

FIGURE 3 is a general schematic view taken along the line 3—3 of FIGURE 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

*Perspective view*

Briefly, the present invention relates to a novel air cleaner that utilizes a cyclonic action precleaner in combination with an oil bath air filter. It is an important aspect of the present invention that an axial flow system is provided giving free air flow and thereby contributing to high engine efficiencies. Further, it is an important aspect of the invention that the air entering the unit is first passed through a cyclonic precleaner provided with a unique throat and dust trap arrangement with a tangential outlet whereby substantially 99% of the particulate materials in the air are recovered by bleeding off approximately 1% of the total gas volume in the unit.

After being largely relieved of its particulate material contamination, the air or gas then passes in an axial manner downwardly through the unit to be reversed in its direction and swept over oil coated surfaces where the remainder of the dust particles are removed and then the gases pass in a free flow manner, as for example; to the intake manifold of an internal combustion engine.

*The environment*

Figure 1:
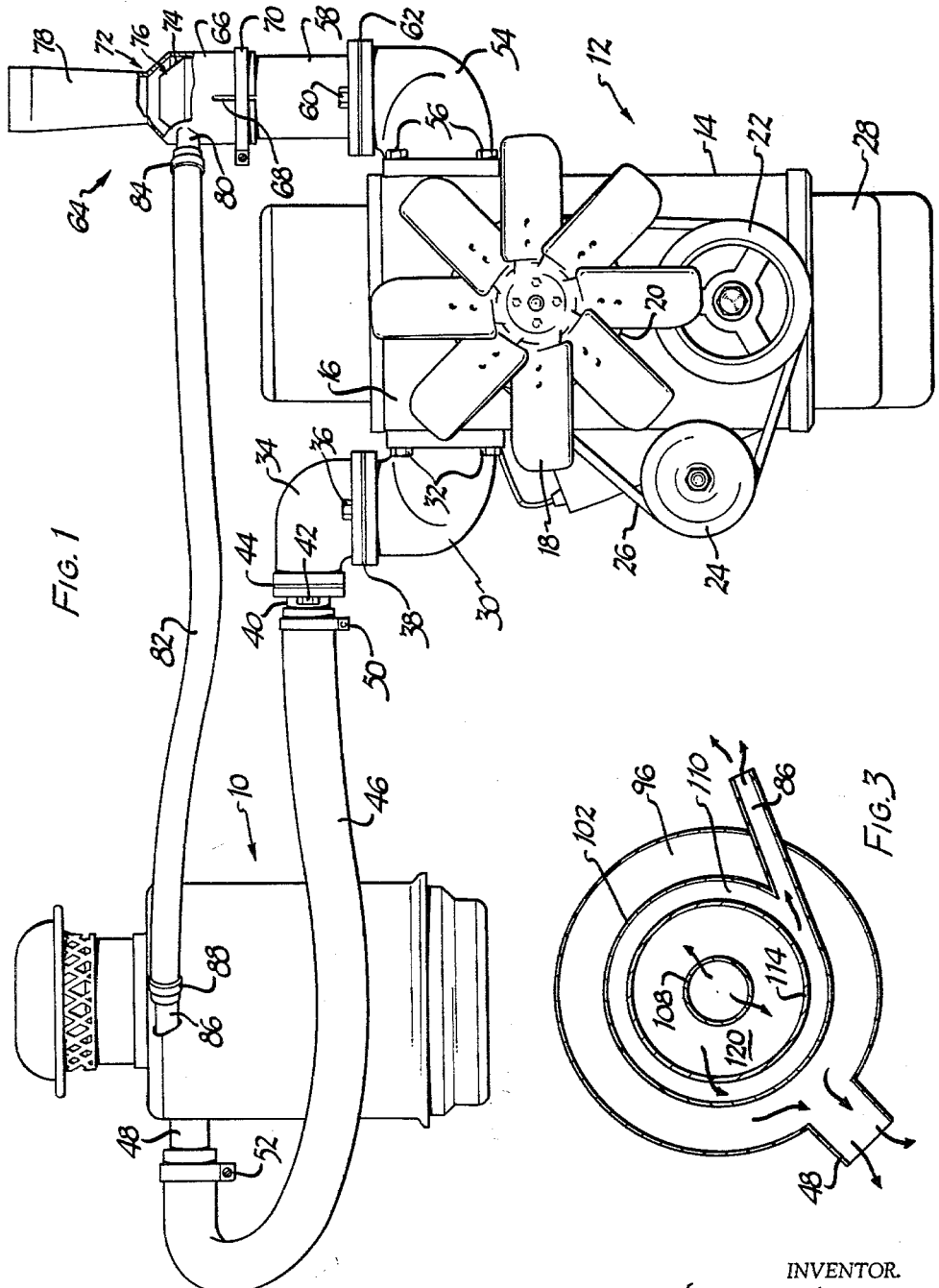
FIGURE 1 is an elevational view illustrating the manner in which an air cleaner made in accordance with the present invention is connected with an internal combustion engine.

As shown in FIGURE 1 of the drawings, the novel air or gas cleaner of the present invention is designated by reference numeral 10 and is connected for use with an internal combustion engine 12, that figuratively represents a heavy duty diesel or the like used for prime movers such as crawler-type tractors, earth movers, cargo trucks and the like.

The internal combustion engine 12 comprises a cylinder block 14 having a head 16 mounted to the top thereof. On the front of the block 14, there is mounted a cooling fan 18 that includes a pulley 20, and a crankshaft mounted drive pulley 22. To the front right side of the block 14 there is mounted a generator, to the front of which is operatively connected a pulley 24. A flexible endless belt 26 is trained about the pulleys 20, 22 and 24 so that the fan and generator can be driven by power received from the crankshaft.

An oil pan 28 covers the bottom of the engine 12, being secured to the bottom of the block 14 in surrounding relationship to the crankshaft to provide a lubricating oil reservoir.

To the head 16 of the engine 12 there is connected an intake manifold 30 having ports leading to the various cylinders for introduction of combustion air. It will be noted at this point that the diesel engine 12 utilizes fuel injection and accordingly no carburetor is illustrated in connection with the intake manifold 30. The manifold 30 is connected to the head 16 by means of bolts 32.

An elbow 34 is fastened to the top of the manifold 30 by means of bolts 36, with a gasket 38 providing a seal. To the open end of the elbow 34 there is fastened a connector 40 by bolts 42 and a gasket 44 is used to provide a seal.

By means of a flexible tube 46, a connection is provided between the intake manifold 30 and the engine air outlet conduit 48 of the air cleaner 10, forming the subject of the present invention. One end of the flexible tube 46 is fastened to the connector 40 by clamp 50 and the other end is fastened to the outlet conduit 48 by clamp 52.

The side of the engine head 16 opposite the inlet manifold 30 is provided with an exhaust manifold 54 that is secured to the engine head by bolts 56. The exhaust manifold 54 is connected with an exhaust pipe 58 by bolts 60, using a gasket 62.

The free end of the exhaust pipe 58 is fitted with a venturi-type aspirator 64. The aspirator 64 includes a lower cylindrical shell section 66, having a compression slot 68, and the shell section is of a diameter whereby it can be fitted over the outside of the exhaust pipe 58. A clamp 70 is positioned around the outside of the cylindrical shell section 66 and is tightened to retain the aspirator 64 in fixed position on the exhaust pipe 58. Thus the gases issuing from the engine through the exhaust pipe 58 pass through the interior of the aspirator 64.

Centrally, the aspirator 64 is necked down as at 74 to provide a restricted flow passage through which the engine exhaust gases pass at an accelerated velocity to produce a pressure drop. Within the cylindrical section 66 there is provided a conical baffle or shell member 74 that terminates at its top and adjacent the restriction 72 to provide an annular slot 76. The top end of the aspirator 64 includes an upwardly and outwardly tapering tube or tail pipe 78 through which the gases are exhausted to the atmosphere.

Just below the restriction 72 of the aspirator 64, an inlet tube 80 is formed. One end of a flexible tube 82 is connected to the inlet tube 80 by means of a clamp 84 and the other end of the tube 82 is connected to a precleaner outlet conduit 86 of the air cleaner 10 of the invention by means of a clamp 88.

Thus clean air for combustion purposes is adapted to be supplied to the engine 12 through the novel air cleaner 10 of the present invention that utilizes power derived from the exhaust of the engine to drive a novel precleaner as will now be described.

The invention

Figure 2:
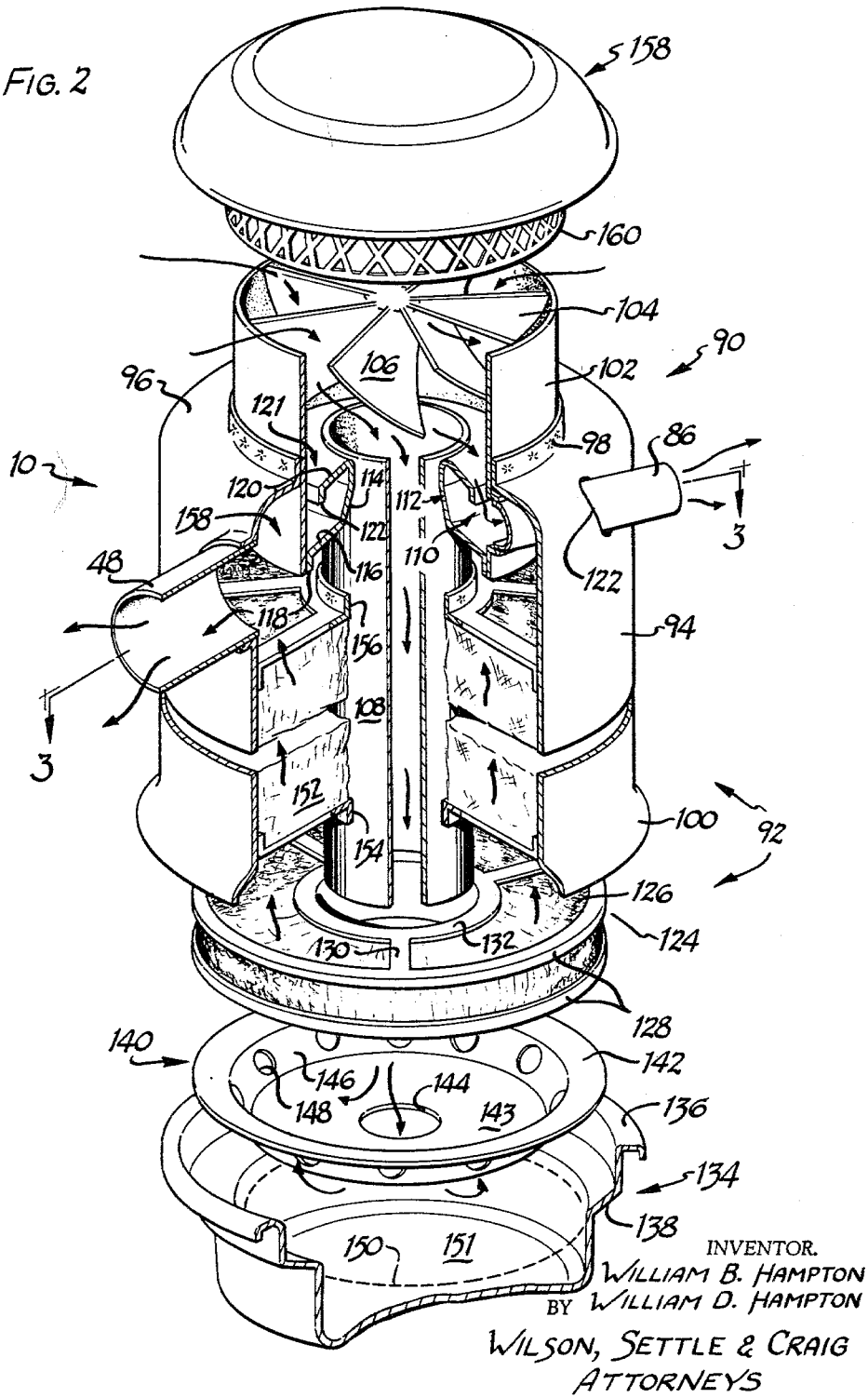
FIGURE 2 is an exploded perspective view of the novel cleaner of the present invention, with some parts broken away in section for clarity.

As shown in FIGURE 2 of the drawings, the novel air cleaner of the present invention includes two principal components in the form of a precleaner 90 and an oil bath air cleaner 92.

The elements 90 and 92 are supported by and within a generally cylindrical housing or wall 94, having an inwardly extending top wall 96, that terminates in a vertically extending annular flange 98. The lower end of the cylindrical wall 94 terminates in an outwardly and downwardly extending annular flange 100.

*The precleaner 90* is mounted to the top end of the housing wall 94 and includes a cylindrical wall 102 fitted within the vertically disposed annular flange 98 to extend upwardly above the top wall 96 and downwardly below said top wall.

Within the upper end of the cylindrical wall 102, there is positioned a fixed fan 104 having angularly disposed blades 106, and the fan is secured in position by spot welding the peripheral ends of the blades 106 to the inside of the cylindrical wall 102.

An important aspect of the precleaner of the invention is the formation of a dust-collecting throat of specific configuration within a carefully measured distance below the fan 104. Thus, a part of the dust-collecting throat is a central air intake tube 108 that is positioned coaxially of the housing 94 and the cylindrical wall 102. As shown, the tube 108 terminates at its upper end at approximately the level of the annular flange 98 and at its bottom end just below the flange 100. Between the upper end of the tube 108 and the lower portion of the cylindrical wall 102 there is provided an annular dust collecting chamber 110 defined by an annular baffle 112 of generally U-shaped configuration. The annular baffle 112, in cross section, includes a bight or web 114 having a portion adapted to contact the outer periphery of the tube 108, and a lower horizontally extending annular flange 116 that extends out into contacting relationship with the interior of the cylindrical wall 102 terminating in a vertical, annular lip 118 whereby it can be secured to the interior of cylindrical wall 102 as by spot welding to provide a seal.

The annular baffle 112 also includes an upper generally horizontally disposed annular flange 120 that terminates at its outer peripheral edge in a downwardly extending annular lip 122. It is very important to efficient dust collecting in accordance with this invention that the lip 122 be spaced about one-eight inch inwardly from the wall 102 to provide an annular gap 121. This dimension is generally applicable to most units for highly efficient dust removal and collection.

The precleaner outlet conduit 86, previously mentioned in connection with the description of FIGURE 1 of the drawings, is tangentially connected to the annular dust collecting chamber 110 and extends in sealed relationship through a hole 122 provided in the outer cylindrical wall 94 of the unit 10. This is illustrated in both FIGURES 2 and 3.

A further important feature in connection with the precleaner of the present invention resides in a proper spacing of the fan 104 above the upper end of the central air intake tube 108 and the annular gap 121 between flange 120 of the annular baffle 112 and the interior surface of wall 102. In units where the dimension of the wall 102 is in the range of about three to about seven inches, it has been found highly desirable to place the fan 104 from about three to about four inches above the annular gap 121. By so operating, highest dust collection efficiencies are provided, substantially 99% of the dust being removed with 1% of the total air flow through the unit.

*The oil bath air cleaner 92* is housed in the lower part of the cylindrical housing wall 94 of the air cleaner 10 and includes an annular open framework 124 that is adapted to retain a wire mesh filtering agent 126. The frame 124 includes upper and lower annular frame members 128 that are connected by radially extending webs 130 to an annular center support member 132 that is adapted to slide up over the lower end of the central air intake tube 108.

The base of the unit comprises a pan 134 terminating at the top edge in an annular flange 136 that is adapted to fit beneath the flange 100 of wall 94 in closely engaging relationship. Clamps not shown are provided for releasably connecting the pan 134 to the bottom of the wall 94. This permits the pan 134 to be dropped away with the removable mesh 126 carried by the open frame 124, for cleaning.

The pan 134 is tapered inwardly at a median vertical point to provide a sloping annular ledge 138 to support an oil baffle pan 140. The oil baffle pan 140 is of shallow, dished configuration and has an annular rim 142, that is adapted to fit upon the sloping annular ledge 138 of the pan 134. The oil baffle pan 140 is provided centrally with an aperture of circular opening 144 and peripherally along slanting wall 146 with a plurality of apertures 148.

In operation an oil level is provided in the pan 134 to approximately the line 150.

Above the flange 100, the housing 94 is partially filled with wire mesh material 152 being supported at the bottom by an annular spider-like framework 154 and retained at the top by a similar spider 156 to permit passage of gas upwardly therethrough. An annular chamber 158 is provided between the top wall 96, outer wall 94, intake tube 108 and the upper spider 156, and the engine air outlet conduit 48 is connected into this chamber through an appropriate opening in the wall 94.

To complete the unit a rain cap 158, which includes a vertically extending cylindrical wall 160 of expanded metal to permit passage of air, is clamped over the top end of the wall 102 to provide a weather-proof cover.

Operation of the invention

As shown in FIGURE 1, and as previously described, the engine air outlet conduit 48 is connected with the intake manifold 30 of the engine 12 and the precleaner outlet conduit 86 is connected with the aspirator 64 that is positioned on the exhaust pipe 58 of the engine 12. Accordingly, the operation of the engine is effective to lower the pressure within the air cleaner 10; and the aspirator 64, operated by the exhaust gases of the engine, is effective to lower the pressure within the annular dust collecting chamber 110 of the precleaner 90. Thus, atmospheric air will be forced inwardly into the top of the unit beneath the cap 158 through the openings in the wall 160 to encounter the blades 106 of the fan 104. The blades 106 are adapted to impart a swirling motion to the incoming air and this swirling motion sets up a centrifugal force so that the heavier particulate materials are thrown outwardly against the wall 102. The reduced pressure in annular chamber 110, produced by the aspirator 64, is effective to pull or cause a small outer portion of the incoming air to be forced through the annular dust collecting gap 121 and carry along the particulate materials to be swept out of the tangentially disposed outlet conduit 86 as shown in FIGURE 3. Because of the desired width of one-eighth inch of the annular gap 121, extremely high efficiencies are provided so that substantially 99% of the dust particles are removed with only about 1% of the air in the improved precleaner of the present invention. Also, the careful spacing of the fan 104 above the gap 121 provides an assurance that the dust particles are captured at the optimum point of the air vortex or whirling cylinder formed by the fan 104.

The remaining 99% of the incoming air passes downwardly through the central air intake tube 108 and a major portion of it is swept over the upper surface of the oil baffle pan 140 so that a large part of the remaining dust particles contained therein are thrown centrifugally downwardly against the top surface 143 of the bottom of the pan 140 to be captured by a thin film of oil retained thereon. This thin film of oil is produced by a sweeping action formed by a small quantity of air going downwardly through the central opening 144 of the oil baffle pan 140 to sweep over the top of the oil body 151 retained in pan 134 and carry some of the oil radially outwardly and upwardly through the holes 148 where it flows back to the opening 144 to carry dust particles with it and drain into the oil body 151 where the particles settle to the bottom of the pan 134. By this oil recharging action, new oil is constantly being drawn from the top of the oil body 151 above any sediment formed therein to constantly wash the top surface of the bottom 143 of the oil baffle pan 140. Therefore, the incoming air initially sweeps over a thin moving film of oil in a reverse direction so that the heavier particles are thrown downwardly and outwardly against this film of oil to be trapped thereby.

The reversing air then moves upwardly to encounter the wire mesh 126 of the removable frame 124. By capillarity, the wire mesh 126 is at least partially coated with oil and as the air passes therethrough, the few remaining dust particles are picked up and removed. The air then passes upwardly through the mesh 152 retained within the lower part of wall 94 which also becomes partially coated with oil, and a second filtering action is thus provided. It will be noted that only about the lower half of the wire mesh 152 is coated with oil during operation of the present device. This provides an assurance that no oil will be carried into the engine to clog the conduit 46 or the intake manifold 30.

Thus, air that is substantially absolutely free of dust particles is delivered by the present cleaner in a highly efficient and troublefree manner.

Extended scope of invention

While the invention has been described as applied to an internal combustion engine, it is to be considered within the scope of the invention to utilize the present novel cleaner for other gas cleaning purposes. Thus, it can be utilized in stationary installations as for vacuum cleaning purposes, as for gas treating purposes and the like. When so operating, a suitable aspirator or pressure reducing device can be attached to the precleaner outlet conduit 86 for providing a satisfactory reduced pressure within the annular dust collecting chamber 110.

When utilizing the present device as a vacuum sweeper, it will be preferable to recover the dust ejected by the precleaner outlet conduit 86 as in a small cyclone separator to avoid air pollution.

Also, it is to be considered within the scope of the invention to utilize other dust collecting fluids than oil so that the cleaner 92 could be broadly described as a fluid bath cleaner.

Advantages of the present invention

From the foregoing, it will be understood that the present invention provides a novel method and apparatus for removing particulate materials from a wide variety of gases. By the present invention, a small percentage of the gas is utilized to withdraw the greater proportion of the particulate materials entrained in the gas and the remaining gas, being substantially completely purified, is additionally passed over a wetted surface to assure complete removal of remaining particulate contaminants.

The disadvantages of delicate prior art filters are overcome by the present invention. Thus, when an operator removes the lower part of the unit to replace the oil bath and clean the bottom wire mesh material, there is no danger during replacement that the filter cartridge will be crimped and rendered ineffective. Thus, by utilizing a substantial replaceable frame, a substantial pan for the bottom of the unit and a substantial oil distributor baffle, malfunction resolving from abusive replacement and cleaning are overcome. Also, since there is no great criticality in the amount of oil contained by the unit, efficient operation will be assured.

Thus, a valuable step forward in the art of operating heavy duty and expensive engines in harsh, dust polluted atmospheres is provided by the present invention to provide efficient operation, low maintenance and greatly extended life to the engines supplied with the present cleaner. Further, in accordance with the present invention most of the moisture is removed by the centrifugal action imparted to the incoming air by the precleaner. It is also an advantage of the invention that the precleaner is self-cleaning and therefore the unit is substantially maintenance free. Only occasionally the oil should be changed and the removable filter unit washed.

Having thus described our invention, we claim:

1. An air cleaner for internal combustion engines or the like comprising a casing having means defining a cylindrical intake chamber at the upper end of said casing, air intake means at the upper end of said intake chamber for directing air entering said intake chamber into a downwardly spiralling flow path, baffle means defining an annular dust collecting chamber at the bottom of said intake chamber communicating with said intake chamber through an annular opening extending around the periphery of said intake chamber, oil bath cleaning means located in the lower end of said casing, a reduced diameter hollow tube extending coaxially from the lower end of said intake chamber to said oil bath means to conduct air from said intake chamber to said oil bath means, said casing and said tube defining therebetween an annular filtering chamber extending upwardly from said oil bath means to the underside of said baffle means, main cleaner outlet means extending through said casing from the upper end of said filtering chamber, and means defining a tangential outlet from said collecting chamber for withdrawing a regulated portion of the air entering said intake means from said cleaner via said collecting chamber.

2. An air cleaner as defined in claim 1 wherein said baffle means comprises an upper flange mounted upon and extending outwardly from the upper end of said tube and terminating at a downwardly turned annular lip spaced inwardly from the wall of said intake chamber, and a lower flange projecting outwardly from said tube at a location spaced below said upper flange to merge with the wall of said intake chamber.

3. An air cleaner for internal combustion engines or the like comprising a casing having a cylindrical wall defining an intake chamber at the upper end of said casing concentric about a vertical axis, air intake means at the upper end of said intake chamber for directing air entering said intake chamber into a downwardly spiraling flow path, a hollow open-ended tube of a diameter substantially less than that of said intake chamber having its upper end located in said intake chamber and extending downwardly therefrom coaxially of said intake chamber to the lower portion of said casing, a first annular flange projecting radially outwardly from said tube at a location spaced below the upper end of said tube and merging at its outer edge with said cylindrical wall, a second annular flange projecting radially outwardly from said tube at the upper end of said tube to an outer edge spaced radially inwardly from said wall, said flanges defining an annular dust collecting chamber surrounding the upper end of said tube and communicating with said intake chamber via the annular space between said wall and the outer edge of said second flange, first outlet pipe means extending tangentially through said cylindrical wall to define an outlet of said collecting chamber, said outlet pipe means being operable to withdraw from between one and five percent of the volume of air entering said intake chamber from said cleaner via said dust collecting chamber, oil bath cleaner means in the lower end of said casing located to receive air from the lower end of said tube and to discharge air upwardly into an annular filtering chamber defined by the space between said casing and said tube, said filtering chamber extending axially upwardly from said cleaner means to the bottom of said first annular flange, and main outlet conduit means extending through said casing from the upper end of said filtering chamber.

References Cited by the Examiner
UNITED STATES PATENTS

| | | | |
|---|---|---|---|
| 1,755,319 | 4/30 | Donaldson | 55—430 X |
| 1,838,512 | 12/31 | Wilson | 55—90 |
| 2,250,226 | 7/41 | Juelson | 55—237 |
| 2,570,623 | 10/51 | Wistor | 55—253 |
| 2,610,701 | 9/52 | Goldberg et al. | 55—473 X |
| 2,802,545 | 8/57 | Heinrich | 55—399 |
| 2,854,093 | 9/58 | Erb | 55—430 X |
| 2,960,184 | 11/60 | Deitlhauser | 55—450 |
| 2,963,009 | 12/60 | Dolza | 123—55 |

FOREIGN PATENTS

| | | |
|---|---|---|
| 737,966 | 10/55 | Great Britain. |
| 830,858 | 3/60 | Great Britain. |

REUBEN FRIEDMAN, *Primary Examiner.*